United States Patent [19]

Saxon

[11] Patent Number: 4,760,868
[45] Date of Patent: Aug. 2, 1988

[54] HIGH CONFIDENCE TUBE PLUG

[76] Inventor: Edward G. Saxon, 230 Rampart Blvd., New Kensington, Pa. 15068

[21] Appl. No.: 99,133

[22] Filed: Sep. 21, 1987

[51] Int. Cl.⁴ ............................................. F16L 55/10
[52] U.S. Cl. ......................................... 138/89; 165/71
[58] Field of Search ................... 138/89, 90; 220/235, 220/236, 237; 411/44, 49, 54, 55, 56, 70; 165/71, 76

[56] References Cited

U.S. PATENT DOCUMENTS

| | | | |
|---|---|---|---|
| 2,107,315 | 2/1938 | Wainwright | 138/89 |
| 2,375,995 | 5/1945 | Kaeser | 138/89 X |
| 2,855,003 | 10/1958 | Thaxton . | |
| 2,870,794 | 1/1959 | Thaxton . | |
| 2,886,067 | 7/1957 | Maxwell et al. . | |
| 3,021,927 | 2/1962 | McKee | 138/89 X |
| 3,323,551 | 6/1967 | Bell et al. . | |
| 4,381,800 | 5/1983 | Leslie . | |
| 4,385,643 | 5/1983 | Noe . | |
| 4,474,216 | 10/1984 | Noe | 138/89 |
| 4,600,036 | 7/1986 | Noe . | |

Primary Examiner—James E. Bryant, III
Attorney, Agent, or Firm—Parmelee, Miller, Welsh & Kratz

[57] ABSTRACT

A tube plug for stopping the bore of a condensor tube or like conduit. The plug device includes a shoulder bolt having a flange at one end and a threaded shaft at the other. An enlarged shank portion extends outwardly a distance from the flange and terminates at a shoulder region. A resilient sleeve of an elastomeric material is positioned on the enlarged shank, bearing against the flange at one end, with the opposite sleeve end spaced outwardly from the bolt shoulder region. Mechanical gripper elements are positioned on the bolt and are expanded by movement of a nut along the threaded shaft. A washer positioned between the resilient sleeve and the mechanical gripper elements transmits an axial compressive force to the resilient sleeve to create first and second fluid seals around the sleeve and around the bolt shank respectively. The washer stops at the shoulder region to permit additional torquing of the mechanical gripping elements independent of the resilient sleeve.

10 Claims, 1 Drawing Sheet

HIGH CONFIDENCE TUBE PLUG

BACKGROUND OF THE INVENTION

The invention relates generally to mechanical devices for plugging or stopping pipes, tubes and like fluid flow conduits. More particularly, the present invention is concerned with devices for plugging condenser tubes used in power generation systems and like systems wherein the plug is subject to moderately high positive and negative pressures (100-200 psi) and system vibrations. Heretofore, it has been known to employ tube plugs in such condenser environments wherein the devices comprise expandable rubber or like elastomeric sleeves to effect a liquid seal against the tube wall. These devices also include extensible mechanical gripper elements which are axially engaged by the sleeve at one end to radially expanded the grippers and frictionally contact the tube sidewall to resist the system fluid pressure and maintain the plug in the desired location. These prior plug devices are not entirely satisfactory since, over a period of time, the resilient elastomeric sleeve materials tend to soften which leads to a decrease in the axial and radial forces imposed on the gripper elements. Continued system vibration and fluid pressure eventually leads to plug loosening and failure. It has been observed that the mechanical grippers of such prior plug devices may become loosened by system vibration due to the fact that the grippers are held in an expanded state at one end by the resilient sleeve and at the other by a threaded nut. This prior arrangement does not afford a positive lock for the nut since the rubber or elastomeric sleeve material is inherently non-rigid.

The present invention solves these prior problems by providing a high confidence tube plug for use in condenser tubes or the like which will resist loosening even if the resilient fluid sealing sleeve should soften over time. The present invention also provides a superior tube plug for high pressure condenser tubes in power generation systems and the like which includes a positive rigid mechanical stop for the gripper elements to resist system vibrations so as to yield a long and reliable service life.

SUMMARY OF THE INVENTION

Briefly stated, these above advantages are realized by the tube plug of the present invention which includes a shoulder bolt having an enlarged flange at one end and a threaded shaft at the other end, with an enlarged diameter shank portion extending from the flange toward the threaded shaft and terminating at a shoulder region around said threaded shaft. A cylindrically shaped, resilient sleeve of an elastomeric material, such as natural rubber or preferably Neoprene rubber, having a central bore of a diameter substantially equal to that of the enlarged shank of the shoulder bolt, is positioned around the shank portion of the bolt. The sleeve has a relaxed diameter equal to or slightly smaller than that of the tube to be plugged. A first end of the resilient sleeve is positioned adjacent the bolt flange and a second end is axially spaced outwardly from the shoulder region of the bolt when the sleeve is in the relaxed or noncompressed state. In other words, the sleeve has an axial length greater than the length of the enlarged bolt shank, as measured from the bolt flange to the shoulder region thereof. A first ring-shaped washer is preferably fitted around the bolt shank, between the flange and the first end of the resilient sleeve. A second ring-shaped washer is positioned around the threaded shaft of the bolt to engage the second end of the resilient sleeve. The second washer has a central bore of a diameter less than the diameter of the enlarged shank of the bolt so that the second washer will contact and form a positive stop against the shoulder region of the bolt when the sleeve is in an expanded or compressed state. The present device further includes a pair of spaced-part, frusto-conically shaped drive elements which are fitted on the threaded shaft with a segmented, tapered gripper assembly positioned between the drive elements. The segmented gripper assembly has a plurality of circumferentially extending grooves formed around respective outer surfaces which are adapted to engage the bore sidewall of the tube when the grippers are in an expanded state. The gripper elements are held loosely in place in a relaxed state around the threaded shaft by a resilient O-ring, preferably of Neoprene rubber, which may also be adapted to form a secondary, partial liquid seal when the grippers are in an expanded position. A third ring-shaped washer is positioned against the outer tapered drive element to be driven by a threaded locking nut rotatably positioned on the end of the threaded shaft of the bolt. The end of the threaded shaft also preferably has a transverse slot formed therein to permit the insertion of a tool, such as a screw driver blade, therein to provide a mechanical purchase on the bolt shaft to prevent the bolt from turning as the nut is being torqued.

In use, the tube plug of the present invention, in an assembled and relaxed (noncompressed) state, is inserted into the tube bore to be plugged. The lock nut is rotated on the threaded shaft of the bolt which causes relative movement of the nut and the third washer toward the bolt flange. Continued bolt tightening causes the tapered drives to move toward one another, which, in turn, drives the segmented grippers into engagement with the sidewall of the tube bore. Further bolt tightening transfers an axial compressive force to the second washer which compresses the resilient sleeve axially and expands the sleeve radially into a fluid tight relationship against the tube wall. The bore wall of the sleeve is also also urged into a sealing engagement against the enlarged shank portion of the bolt to form a second fluid seal therewith. The axial compression and radial expansion/compression of the sleeve continues as the second washer is forced toward the flange, until such time as the second washer bottoms out and contacts the edge of the shoulder region of the enlarged bolt shank. At that point, the axial forces generated by continued bolt tightening are transferred to the tapered drives which, in turn, transmit radial forces to the segmented, mechanical gripper elements. Continued application of bolt torque is translated between the rigid metal components, namely, the bolt shoulder, tapered drives, washers, segmented grippers, and the nut. When the second washer bears against the bolt shoulder (as opposed to the resilient sleeve) a positive stop is achieved to permit independent torquing of the segmented, mechanical grippers. Thus, a positive lock is achieved between all metal components which is not influenced by softening, vibration or weakening of the resilient sleeve.

DETAILED DESCRIPTION OF THE INVENTION

Figure 1:
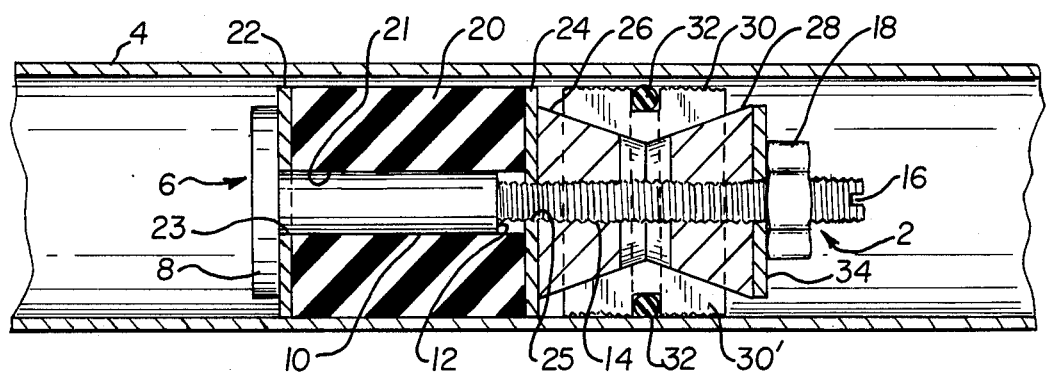
FIG. 1 is a side elevational view, in partial cross-section, of a tube plug of the present invention, in a relaxed or noncompressed state, within a tube bore.
Figure 2:
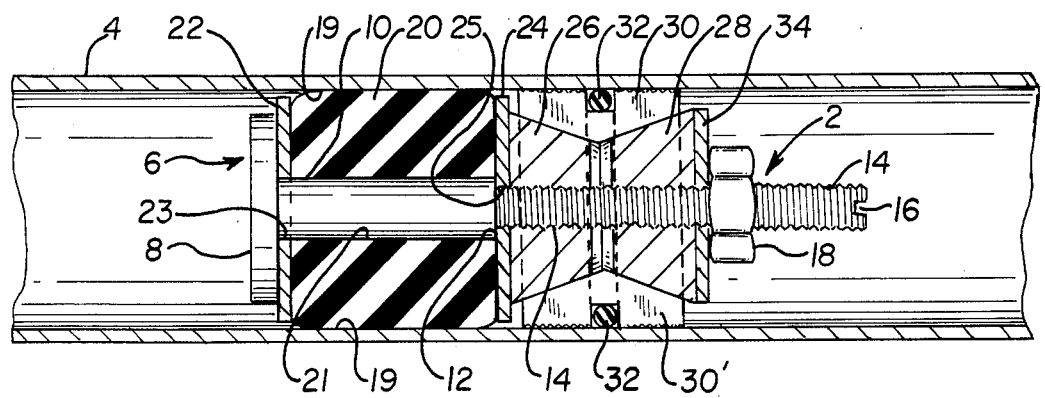
FIG. 2 is a side elevational view of the tube plug of FIG. 1 in an expanded or compressed state within the tube bore.

With reference to the drawings, the high confidence tube plug of the present invention, generally designated by reference number 2, is shown in FIG. 1 in a noncompressed or relaxed state, positioned within the bore of a tube 4. The tube plug 2 is depicted in an expanded or compressed position within the tube bore in FIG. 2. The tube 4 is, for example, a condenser tube in a high pressure fluid system where a tube plug is oftentimes used to prevent inward flow of cooling fluid, such as water, and to contain moderately high pressure condensate within. Such tube bore diameters are between ⅝" to 1¼". Fluid pressure typically are on the order of about 100 to 200 pounds per square inch. The pressures may be applied in a positive or in a negative (vacuum) manner on the plug 2.

A presently preferred form of the tube plug 2 which is particularly suited for condenser tube applications comprises a main bolt element 6 having expandable fluid sealing sleeve section 20 and mechanical gripping sections 30 and 30', as will be explained in greater detail hereinafter. The bolt 6 has a flange 8 at one end thereof and a threaded shaft or shaft 14 at the other end. An enlarged diameter shank portion 10 is formed adjacent the flange end and extends a distance approximately ⅓ to ½ the bolt length, terminating at a shoulder region 12, which forms a flat surface surrounding the threaded shaft 14. The bolt 6 has a length of approximately 2½ inches for the present tube plugging application. The flange 8 has a diameter of about ½ inch.

A cylindrically shaped, resilient sleeve 20 of an elastomeric material, such as natural rubber or preferably Neoprene rubber, is positioned around the enlarged shank 10 of the bolt. The sleeve 20 has a central axial bore 21 which is of a diameter closely matching the diameter of the enlarged shank 10. As seen in FIG. 1, the resilient sleeve 20 when in the noncompressed state has an axial length which is slightly greater, for example about ⅛"-¼" greater than the axial length of the enlarged shank 10, the purpose of which will become more apparent hereinafter. A first washer 22 having a central bore 23 is fitted on the enlarged shank 10 between the flange 8 and a first end of the sleeve 20 to provide a stationary bearing surface between the first end of the sleeve and the bolt flange 8. A second washer 24 having a central bore 25 is positioned on the threaded shaft 14 to bear against a second end of the sleeve 20. The bore 25 of the second washer has a diameter slightly larger than that of the threaded shaft 14, but smaller than the diameter of the enlarged shank 10. The second washer 24 is free to axially move along the shaft 14 in the relaxed position of FIG. 1 until it reaches the expanded or locked position of FIG. 2. In the locked position, the second washer 24 bottoms out or stops against the restriction created by the shoulder 12 of the enlarged bolt shank 10.

A pair of spaced-apart frusto-conically shaped, tapered drive elements 26 and 28, having respective axial bores therethrough are positioned about the threaded shaft 14 and are axially movable thereon. The drives 26 and 28 are identical in shape and have tapered, cone-shaped outer surfaces which are inclined toward one another to describe a generally V-shaped profile as seen in the drawings. A plurality of segmented, mechanical gripper elements 30 and 30' of known configuration are positioned around the threaded shaft 14 between the tapered drives 26 and 28. The mechanical gripper elements or segments 30 and 30' are known in the art and may comprise four, 90° quarter segments. The gripper segments 30 and 30' in a relaxed state, are loosely held in place around shaft 14 by a resilient O-ring 32 preferably of Neoprene rubber, positioned in a continuous groove formed around the outer circumferences of the respective gripper segments 30 and 30', in a known manner. The outer surfaces of the segments 30 and 30' also have a plurality of circumferentially extending ridges or teeth formed therein which tightly engage and locally deform the surface of the tube bore 4 when the segments 30 and 30' are in the expanded position of FIG. 2.

A nut 18, preferably a conventional lock nut, is rotatably positioned on the threaded bolt shaft 14 and is adapted to engage a third washer 34 which, in turn, bears against an enlarged end of the tapered drive element 28. The end of the threaded shaft 14 is also preferably provided with a transverse slot 16 to permit the use of a screw driver or the like therein to prevent the bolt 6 from rotating when the nut 18 is torqued.

In use, the tube plug 2 is inserted into the bore of a tube 4 as in FIG. 1. As the nut 18 is rotated about threaded shaft 14 the nut moves axially toward the flange 8 of the bolt causing the third washer 34 to move the tapered drive element 28 axially toward the mating tapered drive element 26. As the tapered outer surfaces of the drive elements 26 and 28 converge, the surface slidably engage the inner tapered surfaces of the mechanical gripper segments 30 and 30' causing the gripper segments to move radially outwardly until they impinge upon the bore sidewall of the tube 4. Further inward torquing movement of the nut 18 transfers compressive forces in an axial direction to the second washer 24 which compresses the resilient sleeve 20 axially and expands the sleeve 20 radially such that outer sleeve surface 19 tightly engages the bore of the tube 4 to establish a first fluid seal, therebetween, FIG. 2. Simultaneously, the inner sidewall of the bore 21 of the resilient sleeve 20 is axially expanded to tightly engage the circumferential surface of the enlarged bolt shank 10 to establish a second fluid seal therewith. Superior external and internal sleeve sealing of the fluid is thus achieved by the present invention.

Axial compression and corresponding radial expansion/compression of the resilient sleeve 20 continues as the second washer 24 is moved toward the flange 8 until the second washer bottoms out or stops against the flat surface formed by the shoulder 12 of the enlarged shank 10. At this point, the resilient sleeve 20 can be compressed no further and the axial forces generated by continued torquing of the nut 18 are transferred from the tapered drives 26 and 28 radially to the mechanical gripping segments 30 and 30'. Thus, with the second washer 24 in the stopped or bottomed out position against shoulder 12, continued application of bolt torque is taken up by the rigid metal components and not by the resilient sleeve 20. The positive stop provided by rigid shoulder 12 permits the segments 30 and 30' to be moved into gripping engagement with the tube bore at far greater torque levels than would be otherwise possible. Hence, the mechanical gripping action of the present invention is achieved independent of the fluid sealing aspects of the invention. The mechanical grip provided by segments 30 and 30' remains secure even though system vibrations are present which would otherwise adversely influence prior grippers of the type which are torqued directly against the resilient fluid sealing element.

The O-ring 32 carried by the mechanical gripper segments 30 and 30' may possess an enlarged diameter to form a partial secondary fluid seal around the bore of tube 4 when the grippers are tightly torqued in place. The secondary seal, if employed, forms a back-up seal to stop any fluid weepage from the sleeve 20 which migh occur over a period of time due to natural material softening or degredation of the elastomeric material.

The tube plug 2 may be removed from the tube 4 simply by loosening the nut 18 to relax the forces acting on the mechanical gripping elements 30 and 30' and on the resilient sleeve 20 to allow withdrawal thereof. The expandable parts which tend to degrade with time namely, the resilient sleeve 20 and the O-ring 32 may be replaced with new elements and the device 2 is then ready for a new service. The metal parts, namely, the bolt 6; washers 22, 24 and 34; drive elements 26 and 28; gripper segments 30 and 30'; and nut 18 are preferably constructed of a corrosion resistant metal, such as brass titanium or stainless steel. The type of metal or alloy employed in the plug 2 is selected to be compatible with that of the tube 4 so as to prevent galvanic corrosion problems which sometimes occurs when dissimilar metals are in contact in a liquid medium.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A high confidence tube plug for insertion in the bore of a fluid carrying tube, pipe or the like comprising,
    a shoulder bolt having a flange at one end, a threaded shaft at the other end and an enlarged shank portion having a shoulder region therebetween;
    a cylindrically shaped resilient sleeve positioned on said enlarged shank portion of said bolt having an end spaced from said shoulder region;
    a segmented mechanical gripper element positioned on said bolt adjacent said sleeve adapted to expand in a radial direction to grippingly engage said tube bore when an axial force is applied thereto;
    a drive washer slidably positioned on said bolt shaft between said resilient sleeve and the mechanical gripper element; and
    a nut threadably positioned at the end of said threaded shaft adapted, when moved axially along the bolt, to exert a compressive axial force on said drive washer, said resilient sleeve and said mechanical gripper element to establish a fluid seal with said sleeve within the bore when said drive washer moves to a position in contact with said shoulder region, whereupon, continued movement of said nut transfers additional compressive axial force to said mechanical gripper element, to the exclusion of said resilient sleeve, to radially expand said gripper element to establish a mechanical grip within said bore independent of the axial force acting on said resilient sleeve.

2. The tube plug of claim 1 wherein the resilient sleeve comprises a cylindrically shaped element of elastomeric material having an outer surface, a central bore therethrough for placement around said bolt, said resilient sleeve adapted to form a first fluid seal around its outer surface with the tube bore and a second fluid seal between the central bore thereof and the enlarged shaft portion of the bolt.

3. The tube plug of claim 2 wherein the resilient sleeve is constructed of Neoprene rubber.

4. The tube plug of claim 2 wherein the mechanical gripper element comprises a plurality of segmented gripper elements having exterior surfaces forming a cylindrical shape around the threaded shaft of said bolt and having a groove formed around the circumference of said exterior cylindrical surfaces, said gripper element including a resilient O-ring positioned within said groove to hold said segmented gripper elements together and to permit expansion of said segmented gripper elements when said gripper elements are moved to an expanded position within said bore.

5. The tube plug of claim 4 wherein the O-ring is adapted to form a partial fluid seal with the tube bore when said segmented gripper elements are in the expanded position.

6. A high confidence tube plug for insertion in the bore of a fluid carrying tube, pipe or the like, comprising:
    a shoulder bolt having a flange at one end and a threaded shaft at the other end with an enlarged shank portion adjacent said flange, said shank portion extending an axial distance from said flange and terminating at a shoulder region, said shoulder region extending radially outwardly from said threaded shaft;
    a cylindrically shaped resilient sleeve having a central bore therethrough for placement around said enlarged shank portion, said sleeve extending axially, in a noncompressed state, from a first end positioned adjacent said bolt flange to a second end positioned a distance beyond said shoulder region;
    a drive washer having a central bore of a diameter smaller than that of the enlarged shaft portion, movably positioned on said threaded shaft and bearing against the second end of said resilient sleeve;
    a pair of spaced-apart, frusto-conically shaped tapered drive elements slidably positioned on said threaded shaft, one of said tapered elements having a first surface adapted to contact said drive washer and the other of said tapered elements having an axially opposed, second surface;
    a segmented mechanical gripper element positioned around said tapered drive elements adapted to move in a radial direction when said first and second surfaces of the tapered drive elements are moved toward one another; and
    a nut positioned on the threaded shaft adapted to transmit an axial force to said second surface of the other of the tapered drive elements when rotated in a tightening direction, whereby, in use, when said tube plug is inserted within the bore of a tube, continued tightening of said nut causes said tapered drive elements to urge the gripper element into contact with the tube bore and to exert an axial force on said drive washer to move said drive washer to axially compress and radially expand said rsilient sleeve to form first and second fluid seals at the tube bore and around the enlarged bolt shank, respectively, whereupon said drive washer is adapted to stop against said shoulder region so as to permit continued torquing of said nut wherein the gripper element is adapted to be tightened to an expanded position independent of the axial force acting on said resilient sleeve.

7. The tube plug of claim 6 including a first washer positioned around said enlarged shaft of the bolt between the flange thereof and the first end of said resilient sleeve and a second washer positioned between said nut means and said tapered drive means.

8. The tube plug of claim 6 wherein the resilient sleeve is constructed of Neoprene rubber.

9. The tube plug of claim 6 wherein the segmented mechanical gripper element is held in position around said tapered drive means by a resilient O-ring member.

10. The tube plug of claim 9 wherein the segments of the gripper element have grooves formed circumferentially around an outer surface thereof adapted to engage the tube bore when said gripper elements is in an expanded position.

* * * * *